(12) United States Patent
Raaf

(10) Patent No.: US 6,879,823 B1
(45) Date of Patent: Apr. 12, 2005

(54) MOBILE STATION, BASE STATION AND METHOD FOR DATA TRANSMISSION IN A MOBILE RADIO SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/831,179

(22) PCT Filed: Nov. 2, 1999

(86) PCT No.: PCT/DE99/03484

§ 371 (c)(1),
(2), (4) Date: May 4, 2001

(87) PCT Pub. No.: WO00/27150

PCT Pub. Date: May 11, 2000

(30) Foreign Application Priority Data

Nov. 4, 1998 (DE) .......................... 198 50 866
Nov. 9, 1998 (DE) .......................... 198 51 600

(51) Int. Cl.[7] .............................................. H04B 17/00
(52) U.S. Cl. ................... 455/414; 455/53.1; 455/56.1; 455/115; 455/415; 455/67.1
(58) Field of Search ................... 455/414, 412, 455/413, 53.1, 56.1, 67.1; 375/316, 346, 348

(56) References Cited

U.S. PATENT DOCUMENTS

| 5,475,870 | A | * | 12/1995 | Weaver et al. | ............ | 455/67.11 |
| 5,933,465 | A | * | 8/1999 | Ozaki | .......................... | 375/346 |
| 6,085,107 | A | * | 7/2000 | Persson et al. | ............. | 455/522 |
| 6,389,300 | B2 | * | 5/2002 | Raaf | .......................... | 455/561 |

FOREIGN PATENT DOCUMENTS

| WO | WO 92/10886 | 6/1992 |
| WO | WO 94/29981 | 12/1994 |
| WO | WO 97/25827 | 7/1997 |

* cited by examiner

Primary Examiner—Allan Hoosain
(74) Attorney, Agent, or Firm—Bell Boyd & Lloyd LLC

(57) ABSTRACT

A mobile station, base station and method for data transmission in a mobile radio system, wherein for the purpose of observing GSM base stations, interruption phases are inserted in a UMTS transmission. To reduce the number of these interruption phases, the maximum effective duration of the interruption phases is chosen to be shorter than is needed under optimum transmission conditions for secure detection of a data packet which is to be detected and is sent from a GSM base station. A shrewd choice of parameters provides a better ratio of effort (effective duration of the interruption phase) to result (detection probability).

17 Claims, 2 Drawing Sheets

MOBILE STATION, BASE STATION AND METHOD FOR DATA TRANSMISSION IN A MOBILE RADIO SYSTEM

BACKGROUND OF THE INVENTION

1. Field of the Invention

The present invention relates to a base station, a mobile station and a method for data transmission in a communication system, in particular in a CDMA mobile radio system, where the data, structured in frames, is transmitted such that a mobile station is able to perform other functions; in particular, to carry out tests using a reception device, during one or more interruption phases in which it interrupts the reception (of the previous source or of the data from the base station) and/or the processing of received data or sending. "Transmission" is to be understood as sending and/or receiving below.

2. Description of the Prior Art

In communication systems, data (for example voice data, image data or system data) is transmitted on transmission links between base stations and mobile stations. In radio communication systems, this is done using electromagnetic waves via an air or radio interface. In this context, carrier frequencies are used which are situated in the frequency band provided for the respective system. In the case of the GSM (Global System for Mobile Communication), the carrier frequencies are in the range of 900 MHz. For future radio communication systems, for example the UMTS (Universal Mobile Telecommunication System) or other third generation systems, frequencies in the frequency band of 2000 MHz are provided.

Particularly in future CDMA systems, a base station basically sends continuously in the downlink direction, for example, that is to say in the direction from the base station to a mobile station. The data transmitted during sending is usually structured in frames which each have a prescribed length. Particularly with different services such as voice data transmission and video data transmission, the frames may also have different structures and lengths. The structure and/or length of each frame in a continuous series of frames is prescribed and/or is recognized by the mobile station, however.

Particularly in cellular mobile radio systems, the mobile station occasionally also needs to perform functions other than data reception which cannot be performed at the same time, at least during the operation of only a single reception device. By way of example, from time to time the mobile station in a radio communication system of cellular design in which the base stations in various cells send on different frequencies needs to test whether it is able to receive radio signals from another base station with good reception quality. For this purpose, the mobile station sets its reception device to a frequency other than the frequency on which it currently receives data.

In order to be able to send from the base station to the mobile station without interruption, it has already been proposed that the mobile station be equipped with a second reception device. In practice, however, this solution is usually rejected for cost reasons.

Another proposal is known according to which the base station interrupts sending at prescribed times in order to allow the receiving station to carry out an adjacent channel search (search for an adjacent base station or for particular data packets transmitted by these base stations, where data packets also may be understood below to be synchronization, frequency correction or pilot signal bursts) using its individual reception device.

To prevent a loss of data, the base station sends the data beforehand at a higher transmission rate than the fundamentally constant permanent transmission rate. So that this does not result in higher bit error rates (BER), the transmission power additionally needs to be increased during this time.

The frequency at which the interruption phases recur and the length of the interruption phases depend on the particular system and also on the particular operating state of the system. By way of example, interruption phases each having a length of 5 to 6 ms, respectively, are sufficient for an adjacent channel search by a mobile station in a radio communication system organized on a cellular basis. WO-A-97 25827 discloses a method for data transmission, in which interruption phases for observing an adjacent base station are inserted during transmission. However, provision is made in this case for the interruption phases to be inserted at regular intervals, which entails the disadvantage that the efficiency of the data transmission is reduced with each interruption phase.

Since the losses in transmission quality also increase with the number of interruption phases inserted, it is desirable for the smallest possible number of interruption phases to be inserted.

By way of example, a GSM frame transmitted by the GSM base station contains eight timeslots which each contain a data packet. The data packets transmitted by the GSM base station BS2, such as synchronization data packets (data packets to be detected, synchronization burst), frequency correction data packets (characteristic data packets, frequency correction burst) and normal data packets, are all subordinate to the same time frame. The GSM base stations transmit all 10 time frames (GSM frames) 4 times and, after a subsequent 11 time frames (GSM frames) (51 time frames in total), a frequency correction data packet, and one respective time frame later, a synchronization data packet.

If interruption phases based on the GSM standard were now inserted with a period of 26 time frames (GSM frames), the fact that the period of 51 time frames and the period of 26 time frames have no common denominator would cause a cyclic shift in the two time frame periods, so that after a maximum of 11 times 26 time frames, that is to say after 11 observation frames, the sought data packet which is to be detected would be received if the mobile station is not too distant from the respective adjacent base station BS2, BS3 or if no interference which is too intense arises during transmission.

It is an object of the present invention, therefore, to specify a method for data transmission, a mobile station and a base station which permit second base stations to be reliably observed while transmission quality is good.

SUMMARY OF THE INVENTION

Accordingly, the present invention is based, in particular, on the concept of, contrary to the prior art, inserting interruption phases in which the mobile station interrupts the transmission, in particular the reception, of the data sent by the first base station and/or the processing of the received data not with a maximum effective total duration which would be needed under optimum transmission conditions for secure detection of a data packet which is to be detected, but instead inserting fewer and/or shorter interruption phases.

Complex simulations using simulation tools developed specially for this purpose have proved that, when the effective total duration of the interruption phases is shortened, contrary to the prior art, to a duration of a maximum of 9 or a maximum of 10 observation frames, the effective total duration of the interruption phases can be reduced by a much greater proportion than, in return, the theoretical detection probability for a data packet which is to be detected decreases. The effect of this is that the transmission quality from the first base station to a mobile station is improved, but in return the detection probability for a data packet which is to be detected remains comparatively high with respect thereto.

In this case, the data can be sent, by way of example, from the first base station to the mobile station, in which case, at least during particular transmission phases, interruption phases are inserted in which the first base station interrupts sending, and the mobile station interrupts the reception and/or the processing of received data, for example. In addition, the mobile station is switched to the reception of the characteristic data packets and/or data packets which are to be detected, which are sent cyclically by a second base station, and the maximum effective total duration of the interruption phases is shorter than would be needed under optimum transmission conditions for secure detection of a data packet which is to be detected.

The data packets sent by the second base station also may be data packets which are to be detected (synchronization data packets) or characteristic data packets (frequency correction data packets).

In this context, a first transmission method, used by a first base station, may be a CDMA method, and a second transmission method, used by a second base station, may be a GSM method.

Within the context of the application, GSM frame is also understood to be a frame which contains 8 time slots and has a duration of 4.6 ms.

Within the context of the application, observation frame is also understood to be a minimum time period required in order to observe a GSM frame. In this case, the exact duration of an observation frame is implementation-dependent; however, in order to ensure full detection of a GSM frame and to allow for the time needed for changing over the synthesizer frequency, it is generally longer than the duration of a GSM frame and may thus also have a duration of 9 time slots, 10 time slots (5.7 ms), 11 time slots or 12 time slots (6.9 ms).

Since many different variants are possible for inserting the interruption phases for the purpose of the adjacent channel search, the term "maximum effective total duration of the interruption phases" within the context of this application denotes the sum of all the interruption phases inserted as a maximum in order to observe an adjacent base station. However, this does not preclude further interruption phases from being inserted during subsequent repetition of the adjacent channel search, although a new effective total duration of the interruption phases is formed in this case. Under these circumstances, the individual interruption phases each may have the duration of an observation frame, but also may have any other duration. The duration of an interruption phase also may have a multiple or a fraction of the duration of an observation frame. It is also possible for the individual interruption phases to have different durations.

In one embodiment of the present invention, a period of 52 GSM frames lies between the start of a first interruption phase and the start of a second interruption phase.

Simulations have been able to show that this allows the effective total duration of the interruption phases to be reduced to 91%, with a mere loss of 2% needing to be accepted for the detection probability in return, as well as a halving of the search speed in comparison with the GSM search speed.

In another embodiment of the present invention, a period of 6 GSM frames is inserted between the start of a first interruption phase and the start of a first interruption phase and the start of a second interruption phase, and a period of 46 GSM frames is inserted between the start of a second interruption phase and the start of a third interruption phase.

In this case, simulations have been able to show that, at GSM search speed, the maximum effective total duration of the interruption phases can be reduced by 9% for a comparatively very small detection possibility loss of 2%.

In another embodiment of the present invention, the insertion of further interruption phases is ended, restricted or continued under control before the maximum effective total duration of the interruption phases is actually reached. To this end, after reception of a data packet which is to be detected or possibly of another data packet, indicating the end of the adjacent channel search, such as a characteristic data packet, an appropriate message is transmitted from the mobile station to the first base station.

Thus, while data is transmitted from a first base station to a mobile station in the downlink direction, for example, interruption phases are inserted, at least during particular send phases, in which the mobile station interrupts the reception of the data sent by the first base station and/or the processing of the received data and in which the mobile station is switched to the reception of data packets sent by a second base station. Depending on a reception result for these data packets sent by a second base station, information which influences the insertion of interruption phases is sent from the mobile station to the first base station.

In this way, it is possible for the insertion of interruption phases to be ended as soon as possible, and hence to be restricted as far as possible, as soon as sufficient information is known about the second base stations which are to be observed, and hence for the transmission quality to be improved. The effect of this is that the total duration of the interruption phases can be reduced further.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
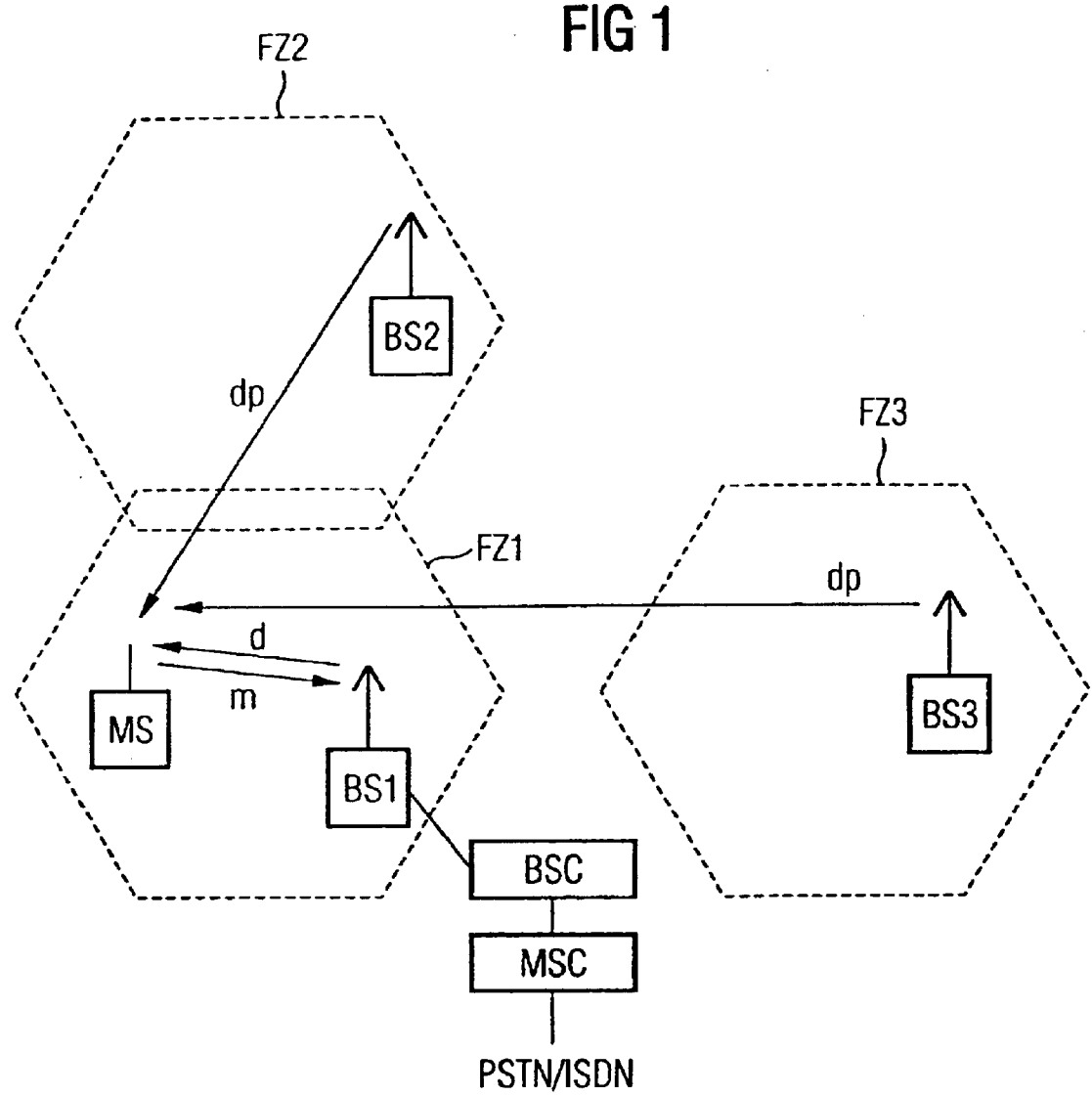
FIG. 1 shows a basic circuit diagram of a mobile radio system.

FIG. 1 shows a cellular mobile radio network including, by way of example, a combination of a GSM (Global System for Mobile Communication) system with a UMTS (Universal Mobile Telecommunication System) system, which includes a multiplicity of mobile switching centers MSC which are interlinked and set up access to a landline network PSTN/ISDN. In addition, these mobile switching centers MSC are connected to at least one respective base station controller BSC, which also may be formed by a data processing system.

Each base station controller BSC is, in turn, connected to at least one base station BS. Such a base station BS is a radio station which is able to use a radio interface to set up a radio link to other radio stations, so-called mobile stations MS. Radio signals can be used to transmit information between the mobile stations MS and the base station BS associated with these mobile stations MS within radio channels situated within frequency bands. The range of the radio signals of a base station defines, in essence, a radio cell FZ.

Base stations BS and a base station controller BSC can be combined to form a base station system. In this context, the base station system BSS is also responsible for radio channel administration and allocation, data rate matching, monitoring of the radio transmission link, handover procedures and, in the case of a CDMA system, for the allocation of the spread code sets which are to be used, and transmits the signaling information required for this to the mobile stations MS.

In the case of a duplex system, the frequency bands provided for the uplink (mobile station to base station) may be different than those provided for the downlink (base station to mobile station) in FDD (Frequency Division Duplex) systems such as the GSM system, and, in TDD (Time Division Duplex) systems, such as the DECT (Digital Enhanced Cordless Telecommunications) system, different time intervals may be provided for the uplink and for the downlink. Within the different frequency bands, an FDMA (Frequency Division Multiple Access) method can implement a number of frequency channels.

Terms and examples used within the context of this application also often refer to a GSM mobile radio system; they are in no way limited thereto, however, but rather also may be easily mapped onto other, possibly future, mobile radio systems, such as CDMA systems, in particular wideband CDMA systems or TD/CDMA systems, by a person skilled in the art using the description. First base station BS1 is understood to be, in particular, a UMTS base station or a CDMA base station, second and/or third base stations BS2, BS3 are understood, in particular, to be GSM (adjacent) base stations which are to be observed, and mobile station is understood, in particular, to be a dual mode mobile station designed both for receiving/sending GSM signals and for receiving/sending UMTS signals or CDMA signals, the dual mode mobile station also being able to be made ready for stationary operation, if appropriate.

Figure 2:
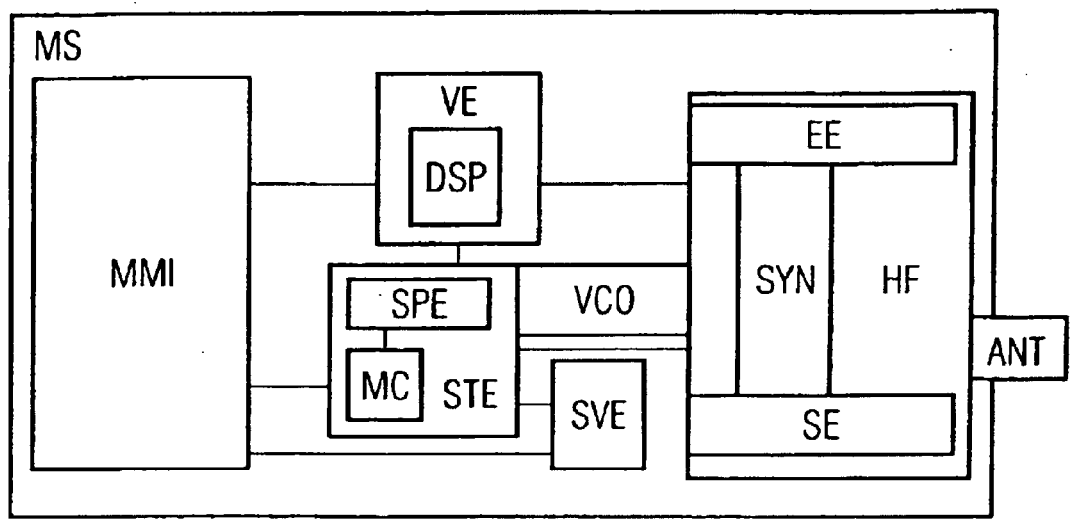
FIG. 2 shows a basic circuit diagram of a mobile station.

FIG. 2 shows a radio station which may be a mobile station MS, including an operating unit MMI, a control device STE, a processing device VE, a power supply device SVE, a reception device EE and a transmission device SE.

The control device STE in essence includes a program controlled microcontroller MC which has write and read access to memory modules SPE. The microcontroller MC controls and supervises all the fundamental elements and functions of the radio station, in essence controls the communication and signaling flow, reacts to keypad inputs by executing the corresponding control procedures and is also responsible for transferring the appliance into different operating states.

The processing device VE also can be formed by a digital signal processor DSP which is likewise able to access memory modules SPE.

The volatile or nonvolatile memory modules SPE store the program data required for controlling the radio station and the communication flow, and also the signaling procedures in particular, appliance information, information entered by the user and information arising during the processing of signals.

The radio frequency part HF includes the transmission device SE, having a modulator and an amplifier, and a reception device EE having a demodulator and likewise an amplifier.

The transmission device SE and the reception device EE are supplied with the frequency of a voltage controlled oscillator VCO using the synthesizer SYN. The voltage controlled oscillator VCO also can be used to generate the system clock for clocking processor devices of the appliance.

For receiving and sending signals via the air interface of a mobile radio system, an antenna device ANT is provided.

The radio station also may be a base station BS. In this case, the operating unit is replaced by a link to a mobile radio network, for example via a base station controller BSC or a switching center MSC. In order to interchange data with a number of mobile stations MS at the same time, the base station BS has an appropriate multiplicity of transmission and reception devices available.

Figure 3:
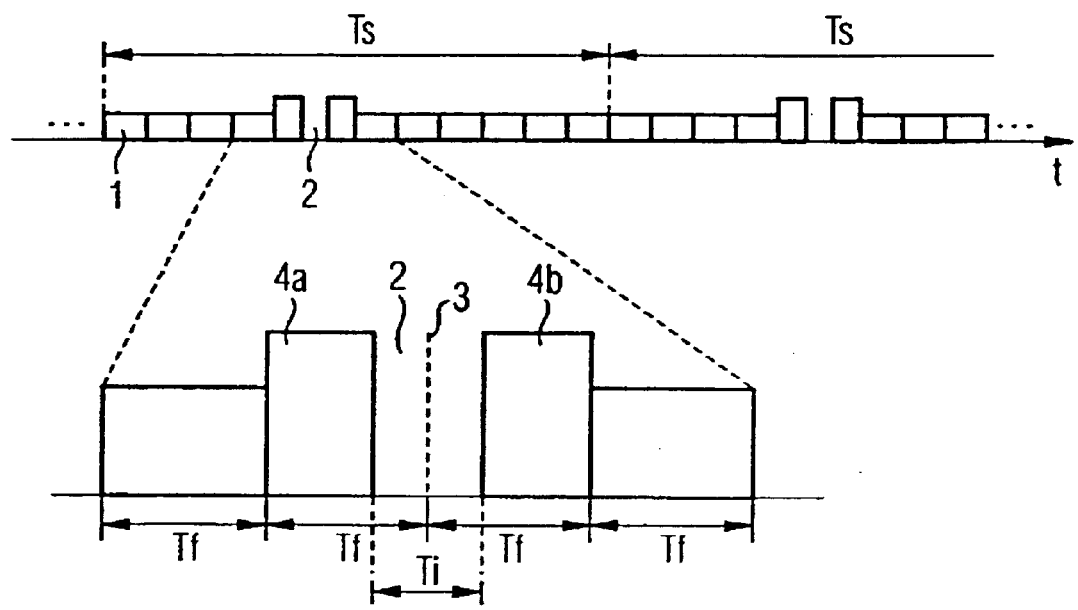
FIG. 3 shows a schematic illustration of the insertion of interruption phases during a send phase.

FIG. 3 shows the frame structure of a data transmission with a short delay time, in particular of voice transmission in a UMTS (Universal Mobile Telecommunication System), containing twelve individual frames 1 for data transmission within a respective multiframe. In this case, the illustration shows, in particular, a send phase in the downlink from a first base station BS1, in particular a UMTS base station BS1, to a mobile station MS, in particular a dual mode mobile station MS, designed not only for receiving UMTS data but also for receiving GSM data packets. The statements employed below are, in essence, restricted to the downlink. It goes without saying, however, that the present invention can be introduced not only to downlink transmission, but also to uplink transmission. It is within the scope of action of a person skilled in the art to introduce the exemplary embodiments demonstrated below for the downlink to uplink transmission.

The individual frames 1 each have a transmission length Tf of 10 ms, wherein the mutliframe has a transmission length Ts of 120 ms in total. The respective fifth and sixth individual frames 1 have a common interruption phase 2 (possibly overlapping their frame boundaries 3) which has a length Ti. The length Ti is 6 ms, for example. The subsections of the first frame 4a, which starts before the interruption phase 2, and of the second frame 4b, which ends after the interruption phase 2, are of the same length or of the same size. In the case of the exemplary embodiment shown in FIG. 3, voice data is being transmitted, so that a maximum delay of 10 ms, that is to say a frame length Tf, when evaluating the data received by the mobile station is acceptable. The data within a frame is sorted, coded together and sent superimposed on one another. In the exemplary embodiment, the transmission rate of the first frame 4a and of the second frame 4b is increased, in each case, such that the same quantity of information which is to be sent, which is sent in uncompressed frames 1 over the frame length Tf, is sent in a time span Tc=Tf−Ti/2.

In this case, during the interruption phases, at least the sending of data to a particular mobile station carrying out the adjacent channel search is interrupted, while sending to other mobile stations can be continued, this being made possible by the use of a multiple access method, for example a CDMA method.

A GSM frame transmitted by the GSM base station contains eight timeslots which each contain a data packet. The data packets transmitted by the GSM base station BS2, such as synchronization data packets (data packets to be detected, synchronization burst), frequency correction data packets (characteristic data packets, frequency correction burst) and normal data packets, are all subordinate to the same time frame. The GSM base stations transmit all 10 time frames (GSM frames) 4 times and, after a subsequent 11 time frames (GSM frames) (51 time frames in total), a frequency correction data packet, and one respective time frame later, a synchronization data packet.

If interruption phases based on the GSM standard were now inserted with a period of 26 time frames (GSM frames), the fact that the period of 51 time frames and the period of 26 time frames have no common denominator would cause a cyclic shift in the two time frame periods, so that after a maximum of 11 times 26 time frames, that is to say after 11 observation frames, the sought data packet which is to be detected would be received if the mobile station is not too distant from the respective adjacent base station BS2, BS3 or if no interference which is too intense arises during transmission.

If the maximum effective total duration of the interruption phases is now reduced, contrary to the prior art, from 11 observation frames to, by way of example, 10 or 9 observation frames when observing GSM base stations during the call phase for a mobile station MS and a UMTS base station BS1, the data transmission within the context of the call by the mobile station MS via the base station BS1 can be improved. The associated reduction in detection probability is comparatively small and is thus acceptable.

In one variant embodiment of the present invention, data packets which are to be detected are transmitted by a second base station BS2 within GSM frames, and interruption phases for adjacent channel observation are inserted into the downlink data transmission from a UMTS base station BS1 to a mobile station MS, with a period of 52 GSM frames lying between the start of a first interruption phase and a second interruption phase.

In another variant embodiment, a period of 26 GSM frames lies between the start of a first interruption phase and a second interruption phase.

In another embodiment of the present invention, a period of n1 GSM frames lies between the start of a first interruption phase and a second interruption phase, and a period of n2 GSM frames lies between the start of a second interruption phase and a third interruption phase.

In another embodiment of the present invention, a period of 6 GSM frames lies between the start of a first interruption phase and a second interruption phase, and a period of 46 GSM frames lies between the start of a second interruption phase and a third interruption phase.

In another embodiment of the present invention, a period of 16 GSM frames lies between the start of a first interruption phase and a second interruption phase, and a period of 36 GSM frames lies between the start of a second interruption phase and a third interruption phase.

By way of example, while the mobile station MS is in the call condition or user data transmission condition with a current UMTS base station BS1, the interruption phases are inserted at particular points in time/intervals of time, between which there may be time spans of fixed or different length, into the downlink transmission, during which the reception device of the mobile station MS is switched to the reception of data packets from respective adjacent GSM base stations BS2, BS3. During the interruption phase 2, the UMTS base station thus interrupts the sending of data to the mobile station MS, and the mobile station MS interrupts the reception and/or the processing of data sent by the UMTS base station BS1. The mobile station MS uses the reception device EE to carry out an adjacent channel search by virtue of the control device STE switching the reception device EE to the reception of adjacent GSM base stations BS2 and of the data packets sent thereby, in order to receive any synchronization data packets dp which arrive, sent by adjacent GSM base stations BS2, BS3.

The aim of the adjacent channel search is also to detect a synchronization data packet which is to be detected. In one embodiment of the present invention, if, in one of these interruption phases, the mobile station MS receives a synchronization data packet which is to be detected, then the adjacent channel search has ended, at least for this base station BS2, and the mobile station MS sends appropriate control information m (SCH-found) to the first base station BS1, the UMTS base station, possibly via suitable signaling channels. The UMTS base station BS1 then inserts no further interruption phases into the downlink data stream d, at least at first. In this case, the effective total duration of the interruption phases is generally shorter than the maximum effective total duration of the interruption phases.

A synchronization data packet which is to be detected also can be detected using the reception of a characteristic frequency correction data packet, since the known frame structure after reception of a frequency correction data packet results in the position of a synchronization data packet to be known. Since, in the GSM system, the base stations BS2, BS3 transmit the frequency correction data packets one time frame before the synchronization data packets, in one embodiment of the present invention, the mobile station MS is able not only to receive synchronization data packets but also to be switched to the reception of frequency correction data packets. In this case, the mobile station MS carries out an adjacent channel search in the interruption phases using the reception device EE, by virtue of the control device STE switching the reception device EE to the reception of adjacent GSM base stations BS2, in order to receive any synchronization data packets and frequency correction data packets which arrive, sent by adjacent GSM base stations BS2, BS3.

Within the context of this application, the concept of "the mobile station being switched to the reception of data packets which are to be detected and/or characteristic data packets" is also understood as, after the customary analog and digital filtering, and possibly derotation, the received data packet being compared (e.g., correlated) with the correlation series corresponding to the training sequence of a characteristic data packet dp and/or with the correlation series corresponding to the training sequence of a data packet dp which is to be detected, and hence data packets which are to be detected and characteristic data packets are sought at the same time or in parallel. Instead of correlation, other methods also may be used if appropriate (e.g., FIR, IRR or other filters). If a data packet is received or detected with sufficient quality, or the information transported using the data packet is ascertained with sufficient quality, etc., the reception result for this data packet can be said to be positive.

In one embodiment, the mobile station MS is now able, after reception of a frequency correction data packet, to send information m to the UMTS base station BS1 (FCCH-found), which information now causes just one further interruption phase to be inserted into the sent data stream at first, in order to receive the synchronization data packet following the frequency correction data packet at a fixed distance. The knowledge about the relative positions in time of the frequency correction data packet and the synchronization data packet allows the position in time and also the duration (since the timeslot is now known) of the interruption phase which is to be inserted to be matched to the position in time of the synchronization data packet which is to be detected. Corresponding information about the position in time of a frequency correction data packet or of a following synchronization data packet can be transmitted with the FCCH-found message.

In another embodiment of the present invention, the mobile station is first switched to the observation of a first adjacent GSM base station BS2, after a successful search or on the basis of knowledge about an unsuccessful search the adjacent channel search is carried out for one or more further GSM base stations BS3, and when the adjacent channel search for a number of adjacent GSM base stations BS2, BS3 has ended successfully and/or without success, information m for influencing and/or restricting and/or ending and/or controlled continuation of the insertion of interruption phases is transmitted to the UMTS base station BS1. To this end, the initially ascertained results for the adjacent channel search can be temporarily stored using memory devices SPE in the mobile station MS.

In one embodiment of the present invention, if no adjacent channel search is successful, this is signaled, likewise using appropriate information m (FCCH/SCH-not-found), and the UMTS base station inserts no further interruption phases into the downlink data stream d at first.

In another embodiment of the present invention, the results of the adjacent channel search, for example the identity of the adjacent base station and the reception quality or field strength of the signals received from the adjacent base stations, are transmitted to the UMTS base station BS1 together with the information for influencing the insertion of interruption phases as one message, which may be split over a number of frames if appropriate.

In another embodiment of the present invention, the first base station BS1 is also a GSM base station which transmits data on the basis of a GSM standard or of a standard derived therefrom.

Although the present invention has been described with reference to specific embodiments, those of skill in the art will recognize that changes may be made thereto without departing from the spirit and scope of the invention as set forth in the hereafter appended claims.

What is claimed is:

1. A method for data transmission in a mobile radio system, the method comprising the steps of:
   transmitting data between a first base station and at least one mobile station based on a first transmission method;
   inserting interruption phases, at least during particular transmission phases, in which the mobile station interrupts the transmission of the data and in which the mobile station is switched to reception of data packets sent by a second base station based on a second transmission method, the second base station operating on a GSM standard which is based on a synchronization frame structure having a period of 51 frames; and
   inserting interruption phases having an effective total duration of a maximum of 10 observation frames.

2. A method for data transmission and a mobile radio system as claimed in claim 1, wherein a period of 52 GSM frames lies between a start of a first interruption phase and a start of a second interruption phase.

3. A method for data transmission in a mobile radio system as claimed in claim 1, wherein a period of 26 GSM frames lies between a start of a first interruption phase and a start of a second interruption phase.

4. A method for data transmission in a mobile radio system as claimed in claim 1, wherein a period of n1 GSM frames lies between a start of a first interruption phase and a start of a second interruption phase, and a period of n2 GSM frames lies between the start of the second interruption phase and a start of a third interruption phase.

5. A method for data transmission in a mobile radio system as claimed in claim 4, wherein a period of 6 GSM frames lies between the start of the first interruption phase and the start of the second interruption phase, and a period of 46 GSM frames lies between the start of the second interruption phase and the start of the third interruption phase.

6. A method for data transmission in a mobile radio system as claimed in claim 4, wherein a period of 16 GSM frames lies between the start of the first interruption phase and the start of the second interruption phase, and a period of 36 GSM frames lies between the start of the second interruption phase and the start of the third interruption phase.

7. A method for data transmission in a mobile radio system as claimed in claim 1, the method further comprising the step of:
   transmitting, via the mobile station and after reception of at least one of a characteristic data packet and a data packet to be detected from the second base station, information for influencing insertion of further interruption phases to the first base station.

8. A mobile station, comprising:
   a transmitter for transmitting data from and to a first base station based on a first transmission method;
   an insert g unit for inserting pauses at least during particular transmission phases in the transmission of data is interrupted; and a switch for switching to reception of data packets sent by a second base station based on a second transmission method, the second base station operating on a GSM standard which is based on a synchronization frame structure having a period of 51 frames, wherein interruption phases having an effective total duration of a maximum of 10 observation frames are inserted.

9. A mobile station as claimed in claim 8, wherein a period of 52 GSM frames lies between a start of a first interruption phase and a start of a second interruption phase.

10. A mobile station as claimed in claim 8, wherein a period of 52 GSM frames lies between a start of a first interruption phase and a start of a second interruption phase.

11. A mobile station as claimed in claim 8, wherein a period of n1 GSM frames lies between a start of a first interruption phase and a start of a second interruption phase, and a period of n2 GSM frames lies between the start of the second interruption phase and a start of a third interruption phase.

12. A mobile station as claimed in claim 8, further comprising:
   a device for ascertaining a reception result for the data packets received from the second base station; and
   a sending unit for sending to the first base station information which influences insertion of further interruption phases.

13. A base station comprising:
   a transmitter for transmitting data from and to a mobile station; and
   an inserting unit for inserting interruption phases at least during particular transmission phases in which the mobile station interrupts the transmission of data and in which the mobile station is switched to reception of data packets sent by a second base station based on a second transmission method, the second base station operating on a GSM standard which is based on a synchronization frame structure having a period of 51 frames, and interruption phases having an effective total duration of a maximum of 10 observation frames are inserted.

14. A base station as claimed in claim 13, wherein a period of 52 GSM frames lies between a start of a first interruption phase and a start of a second interruption phase.

15. A base station as claimed in claim 13, wherein a period of 26 GSM frames lies between a start of a first interruption phase and a start of a second interruption phase.

16. A base station as claimed in claim 13, wherein a period of n1 GSM frames lies between a start of a first interruption phase and a start of a second interruption phase, and a period of n2 GSM frames lies between the start of the second interruption phase and a start of a third interruption phase.

17. A base station as claimed in claim 13, further comprising:

- a receiver for receiving information which influences insertion of interruption phases; and
- a unit for influencing insertion of interruption phases based on a reception result.

* * * * *